United States Patent
Suda (10) Patent No.: US 9,634,583 B2
(45) Date of Patent: Apr. 25, 2017

(54) MOTOR DRIVEN APPLIANCE AND PROTECTION METHOD THEREOF

(71) Applicant: MAKITA CORPORATION, Anjo-shi, Aichi (JP)

(72) Inventor: Hidekazu Suda, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 74 days.

(21) Appl. No.: 14/612,626

(22) Filed: Feb. 3, 2015

(65) Prior Publication Data

US 2015/0222205 A1    Aug. 6, 2015

(30) Foreign Application Priority Data

Feb. 5, 2014    (JP) .................................. 2014-020328

(51) Int. Cl.
  *H02P 3/02*  (2006.01)
  *H02P 29/024*  (2016.01)

(52) U.S. Cl.
  CPC ............ *H02P 3/02* (2013.01); *H02P 29/0241* (2016.02)

(58) Field of Classification Search
  CPC ............................... H02P 3/02; H02P 29/0241
  USPC ........................................ 318/445, 474, 476
  See application file for complete search history.

(56) References Cited

U.S. PATENT DOCUMENTS

| | | | | |
|---|---|---|---|---|
| 2004/0041531 A1* | 3/2004 | Chu | .......................... | H02P 7/29 318/376 |
| 2009/0295313 A1* | 12/2009 | Suzuki | ..................... | B25F 5/00 318/139 |
| 2010/0001675 A1* | 1/2010 | Matsunaga | ............. | H02P 29/00 318/446 |
| 2010/0237126 A1* | 9/2010 | Matsunaga | ............... | B25C 1/08 227/8 |
| 2012/0162840 A1 | 6/2012 | Noda | | |
| 2012/0262035 A1* | 10/2012 | Takano | ..................... | B25F 5/02 310/68 R |
| 2012/0279743 A1* | 11/2012 | Suda | ....................... | B25F 5/001 173/176 |
| 2014/0368133 A1* | 12/2014 | Nakano | ..................... | H02P 3/14 318/379 |
| 2014/0375231 A1* | 12/2014 | Suzuki | ................ | B60L 11/1861 318/139 |

FOREIGN PATENT DOCUMENTS

JP     2012-135849 A     7/2012

* cited by examiner

*Primary Examiner* — Kawing Chan
(74) *Attorney, Agent, or Firm* — Oliff PLC (57) ABSTRACT

A motor driven appliance in one aspect of embodiments of the present disclosure comprises a motor, a first switching element, a second switching element, an operation unit, a control unit, and a monitoring unit. The first and second switching elements are provided on a current path from a power source to the motor, and are connected in series to each other. The monitoring unit monitors an operating state of a protection function by the control unit, and, when the protection function is activated, outputs an OFF signal for turning off the second switching element.

12 Claims, 6 Drawing Sheets

| | | Sa | Sb | Sc | FIRST FET | SECOND FET | Sd | D-FF | | | | Se |
|---|---|---|---|---|---|---|---|---|---|---|---|---|
| | | | | | | | | D | CL | RES | Q | |
| 1 | WHILE OPERATION SWITCH IS TURNED OFF (WHILE OPERATION OF TOOL IS STOPPED) | H | L | L | OFF | OFF | L | H | L | L | L | H |
| 2 | WHEN OPERATION SWITCH IS TURNED ON (WHILE TOOL IS OPERATING) | L | H | H | ON | ON | H | H | L | H | L | H |
| 3 | WHEN PROTECTION FUNCTION IS ACTIVATED | L | L | H | OFF | OFF (※1) | L | H | H | H | H | L |
| 4 | AFTER PROTECTION FUNCTION IS ACTIVATED WHEN CPU MALFUNCTIONS | L | H | H | OFF | OFF | L | H | H | H | H | L |
| 5 | WHEN OPERATION SWITCH IS TURNED OFF | H | L | L | OFF | OFF | L | H | L | L | L | H |

※1 : SECOND FET 12 IS TURNED OFF BY SIGNAL Se BECOMING L LEVEL

MOTOR DRIVEN APPLIANCE AND PROTECTION METHOD THEREOF

CROSS-REFERENCE TO RELATED APPLICATIONS

This application claims the benefit of Japanese Patent Application No. 2014-020328 filed Feb. 5, 2014 in the Japan Patent Office, and the entire disclosure of which is incorporated herein by reference.

BACKGROUND

The present disclosure relates to a motor driven appliance with a motor.

Various motor driven appliances (such as, for example, electric power tools and electric working machines) are known that comprise a switching element provided on a current path from a power source to a motor, and that are configured so that, when a user turns on an operation switch, the switching element is turned on to drive the motor. An example of a motor driven appliance configured as such has a protection function to forcibly turn off the switching element even if the operation switch is turned on when an abnormality occurs during driving of the motor, thereby to stop the conduction.

A device for electric power tool disclosed in Japanese Unexamined Patent Application Publication No. 2012-135849 is configured such that, when an operation switch is turned on, a control unit turns on a switching element to conduct a current path from a battery to a motor, thereby to drive a motor. The device has an overload protection function to protect the battery against overload. The overload protection function is a function in which the control unit turns off the switching element when the battery is overloaded during driving of the motor, thereby to cut off the current path from the battery to the motor.

SUMMARY

The protection function as above in which the control unit turns off the switching element when an abnormality occurs can cause a problem in that the motor starts to rotate again in the following manner. For example, even if an abnormality occurs and the control unit turns off the switching element, a short circuit failure may thereafter occur to the switching element for some reason. Further, for example, even if an abnormality occurs and the control unit turns off the switching element, the control unit may thereafter malfunction for some reason and the switching element may be turned on.

Probability of occurrence of the above problems can be reduced if the user immediately turns off the operation switch when the motor is stopped due to the protection function. However, when the protection function is activated during work and the motor stops, the user does not necessarily turn off the operation switch immediately. Especially, in the case of a switch with a so-called lock-on mechanism, wherein, after the operation switch is turned on, the ON state is maintained even if the user take his/her hand off the operation switch, it is very likely that the ON state of the operation switch continues to be maintained even after the protection function is activated and the motor stops.

In one aspect of embodiments of the present disclosure, it is desirable that a technique can be provided in the motor driven appliance in which, when a protection function is activated during driving of a motor and the motor is stopped, the stopped state can be maintained more successfully.

A motor driven appliance according to one aspect of embodiments of the present disclosure comprises a motor, a first switching element, a second switching element, an operation unit, a control unit, and a monitoring unit.

The first and second switching elements are provided on a current path from a power source to the motor, and are connected in series to each other. The operation unit receives an external operation input for driving the motor.

The control unit activates a control function and a protection function. The control function is a function to output a control signal for turning on the first switching element in accordance with an operating state of the operation unit. The protection function is a function to stop the output of the control signal irrespective of the operating state of the operation unit when a predetermined protection condition is satisfied while the control signal is being output.

The monitoring unit monitors an operating state of the protection function by the control unit, and, when the protection function is activated, outputs an OFF signal for turning off the second switching element.

In the motor driven appliance configured as such, the control unit activates the protection function in the case where the protection condition is satisfied during the output of the control signal, and turns off the first switching element. When the first switching element is turned off, the current path from the power source to the motor is cut off, and the motor stops. If the protection function by the control unit is activated, the monitoring unit separate from the control unit turns off the second switching element.

Therefore, after activation of the protection function by the control unit, even if the control unit malfunctions for some reason and the control signal is output, the stopped state of the motor is maintained since at least the second switching element is turned off by the monitoring unit. Also, after activation of the protection function by the control unit, even when a short circuit failure occurs to the first switching element for some reason, the stopped state of the motor is maintained since the second switching element is turned off by the monitoring unit.

According to such a motor driven appliance, when the protection function is activated during driving of the motor and the first switching element is turned off thereby to stop the motor, the second switching element is also turned off by the monitoring unit. Therefore, after activation of the protection function by the control unit, it is possible to maintain stopped state of the motor more successfully, and to provide a motor driven appliance that is highly reliable.

The monitoring unit may monitor the operating state of the protection function based on states of at least two monitored objects in the motor driven appliance. By monitoring the states of the at least two monitored objects, the operating state of the protection function can be easily and properly monitored.

If the monitoring unit monitors the operating state of the protection function based on the states of the at least two monitored objects as above, a first monitored object of the at least two monitored objects may be an object that changes its state in accordance with the operating state of the motor. In that case, the monitoring unit, after the motor starts to be driven, and when the first monitored object is in a state that satisfies a motor stop condition that is a condition under which the motor stops (condition directly or indirectly indicating that the motor is stopped) and when a second monitored object of the at least two monitored objects is in a specific state, may output the OFF signal.

If the protection function by the control unit is activated, the first switching element is turned off, and the motor is stopped. Therefore, if one of the at least two monitored objects above is an object that changes its state directly or indirectly in accordance with the operating state of the motor, whether the protection function is activated (and whether to output the OFF signal), together with states of other monitored objects, can be properly monitored.

The second monitored object of the at least two monitored objects may be the operation unit. In that case, the specific state may comprise a state in which a predetermined operation for driving the motor is made to the operation unit. In other words, the monitoring unit may output the OFF signal when the motor stop condition is satisfied and the predetermined operation is made to the operation unit.

After the motor starts to be driven, if the motor stop condition is satisfied although the predetermined operation is made to the operation unit, it can be easily deduced that the protection function by the control unit is activated and the motor is stopped. Therefore, the monitoring unit monitors the operating state of the operation unit while monitoring the state of the first monitored object that changes its state in accordance with the operating state of the motor, thereby to be able to properly monitor whether the protection function is activated.

The motor stop condition may comprise any conditions. For example, the motor stop condition may comprise a condition that no voltage is applied to the motor necessary to drive the motor. The motor is usually driven (rotated) when the voltage required for driving is applied and stops when the voltage required for driving is not applied. Therefore, whether the condition under which the motor stops is satisfied can be easily and reliably determined by monitoring the voltage applied to the motor.

Further, for example, the motor stop condition may comprise a condition that the control signal is not being output from the control unit. If the control signal is not being output from the control unit, the first switching element is not turned on, and the motor is not driven. Therefore, whether the condition under which the motor stops is satisfied can be easily and appropriately determined by monitoring whether the control signal is being output from the control unit.

The first switching element may comprise first and second terminals, and may be configured such that, when the first switching element is turned on, a current to flow from the power source to the motor flows from the first terminal to the second terminal through the first switching element.

In this case, the motor stop condition may comprise a condition that a voltage between the first terminal and the second terminal is equal to or greater than a predetermined voltage threshold that is greater than a voltage at which the first switching element is turned on and the motor is driven.

When the first switching element and the second switching element are both turned on and the motor is conducted, the voltage between the first terminal and the second terminal is approximately zero. In other words, an electric potential difference is hardly generated in the first switching element. On the other hand, for example, when the output of the control signal from the control unit is stopped and the first switching element is turned off, whereby conduction to the motor is stopped, a voltage (for example, a value close to a power source voltage) that is greater than that applied during driving of the motor is applied between the first terminal and the second terminal, as long as the second switching element is turned on. Therefore, whether the condition under which the motor stops is satisfied can be easily and properly determined by monitoring the voltage between the first and second terminals.

The motor driven appliance may further comprise a forcing turn-off unit that is configured to turn off the first switching element irrespective of whether the control signal is being output from the control unit when the OFF signal is being output from the monitoring unit.

With the forcing turn-off unit, both the first and second switching elements can be turned off when the OFF signal is output from the monitoring unit. Therefore, even if the control unit malfunctions and outputs the control signal after activation of the protection function, both the first and second switching elements can be kept turned off. Thereby, the stopped state of the motor can be more securely maintained after activation of the protection function.

The monitoring unit may be configured to continue the output of the OFF signal until a specific release condition is satisfied if it outputs the OFF signal. In that case, the release condition may comprise any conditions. For example, the release condition may comprise a condition that the operation unit is operated to a predetermined state for stopping the driving of the motor.

As above, if the OFF signal is output from the monitoring unit and the motor is forcibly stopped, the stopped state of the motor is maintained until the release condition is satisfied. Thereby, it is possible to properly maintain the stopped state of the motor, and to make available the motor driven appliance again at appropriate timing.

Another aspect of embodiments of the present disclosure is a protection method of a motor driven appliance comprising a motor and an operation unit configured to accept an external operation input for driving the motor. This method comprises providing first and second switching elements connected in series to each other on a current path from a power source to the motor, activating a protection function that turns off the first switching element irrespective of an operating state of the operation unit thereby to stop the motor when a predetermined protection condition is satisfied, and turning off the second switching element when the protection function is activated.

According to this method, in the motor driven appliance, when the protection function is activated during the driving of the motor and the motor is stopped, the stopped state can be maintained more successfully.

BRIEF DESCRIPTION OF THE DRAWINGS

Exemplified embodiments of the present disclosure will be described below by way of example with reference to the accompanying drawings in which.

DETAILED DESCRIPTION OF THE PREFERRED EMBODIMENTS

First Embodiment (1) Electrical Configuration of Electric Power Tool 1

Figure 1:
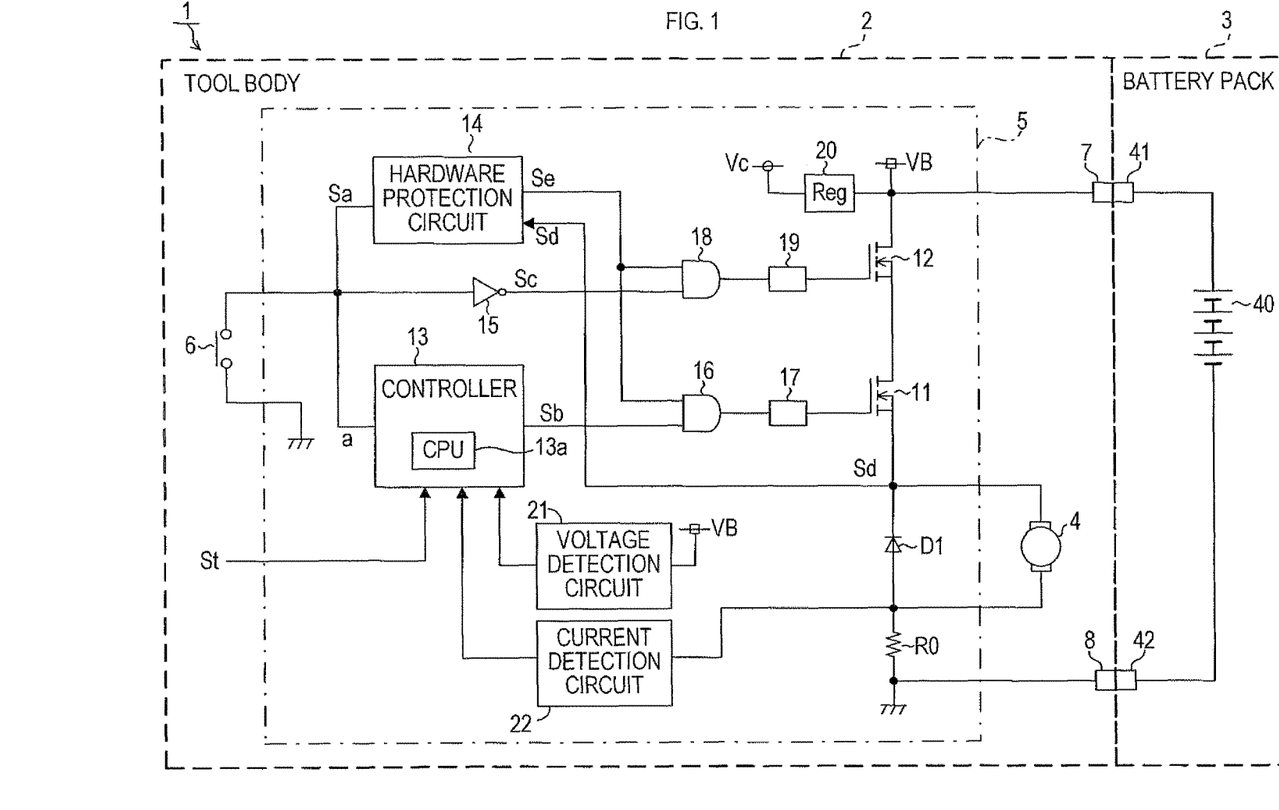
FIG. 1 is a circuit diagram showing a configuration of a motor driven appliance of a first embodiment.

An electric power tool 1 of the first embodiment shown in FIG. 1 is, for example, an electric power tool used such as to drill a workpiece and tighten a screw.

As shown in FIG. 1, the electric power tool 1 comprises a tool body 2 and a battery pack 3. The battery pack 3 is detachably attached to the tool body 2. FIG. 1 shows a state in which the battery pack 3 is attached to the tool body 2.

The battery pack 3 comprises a battery 40, a positive terminal 41 and a negative terminal 42. The battery 40 may comprise a plurality of cells connected in series or a plurality of cells connected in series-parallel. Each cell may be a rechargeable battery (for example, a lithium ion rechargeable battery) cell.

In the battery pack 3, a positive electrode of the battery 40 is connected to the positive terminal 41, and a negative electrode of the battery 40 is connected to the negative terminal 42. The battery pack 3 comprises a not shown control circuit that monitors battery voltage and temperature, discharge current, etc., and performs various processes based on the monitoring result.

The tool body 2 comprises a motor 4, a control circuit 5, an operation switch 6, a positive terminal 7, and a negative terminal 8. The motor 4 is a drive source for rotationally driving a tool bit (not shown). When the motor 4 is rotating, its rotational driving force is transmitted to the tool bit via a not shown driving force transmission mechanism, which thereby rotates the tool bit. The motor 4 of the first embodiment is a brushed DC (direct current) motor.

The operation switch 6 is turned on and off by a user. When the user turns on the operation switch 6, the motor 4 is driven (rotated) as described below, and various works can be performed. When the user turns off the operation switch 6, the driving of the motor 4 is stopped (rotation stops), as described below.

The operation switch 6 of the first embodiment is, for example, a slide type switch, that is configured to be turned on when slid to one end side (ON position) of the operation switch 6 and turned off when slid to the other end side (OFF position) of the operation switch 6.

The operation switch 6 of the first embodiment has a so-called lock-on mechanism wherein an ON position state is mechanically maintained even if the user takes his/her hand off the operation switch 6 after the operation switch 6 is turned on. Therefore, when the user turns on the operation switch 6 and the motor 4 is rotated, the rotation of the motor 4 continues even if the user takes his/her hand off the operation switch 6. In order to stop the rotation of the motor 4, the user has to operate the operation switch 6 to the OFF position.

One end of the operation switch 6 is connected to a controller 13, a hardware protection circuit 14, and a first NOT circuit 15, inside the control circuit 5. The other end of the operation switch 6 is connected to a ground line (line having a ground potential), inside the control circuit 5.

The positive terminal 7 is mechanically and electrically connected to the positive terminal 41 of the battery pack 3, when the battery pack 3 is attached to the tool body 2. The negative terminal 8 is mechanically and electrically connected to the negative terminal 42 of the battery pack 3, when the battery pack 3 is attached to the tool body 2. Therefore, when the battery pack 3 is attached to the tool body 2, a voltage (battery voltage VB) of the battery 40 is applied between the positive terminal 7 and the negative terminal 8 of the tool body 2.

The control circuit 5 comprises a first FET 11, a second FET 12, the controller 13, the hardware protection circuit 14, the first NOT circuit 15, a first AND circuit 16, a second AND circuit 18, a first driver 17, a second driver 19, a regulator 20, a voltage detection circuit 21, and a current detection circuit 22.

The first FET 11 and the second FET 12 are both N-channel MOSFETs. The first FET 11 and the second FET 12 are connected in series to each other. That is, a drain of the first FET 11 is connected to a source of the second FET 12. A drain of the second FET 12 is connected to the positive terminal 7. A source of the first FET 11 is connected to one end of the motor 4. The other end of the motor 4 is connected to the negative terminal 8 through a current sensing resistor R0 that is a resistor for current detection.

The negative terminal 8 is connected to the ground line of the control circuit 5. To the motor 4, a diode (so-called flywheel diode) D1 for absorbing a counter electromotive force generated in the motor 4 when conduction to the motor 4 is cut off is connected in parallel.

With this configuration, when the battery pack 3 is attached to the tool body 2, and the positive terminal 7 and the positive terminal 41 are connected and the negative terminal 8 and the negative terminal 42 are connected, a current path leading to the motor 4 from the battery 40 through the first FET 11 and the second FET 12 is formed. When a current flows to this current path from the battery 40, the motor 4 is rotated. Hereinafter, unless otherwise noted, explanation will be continued on the assumption that the battery pack 3 is attached to the tool body 2.

The first driver 17 is connected to a gate of the first FET 11. The first driver 17 turns on and off the first FET 11 in accordance with a first drive signal input from the first AND circuit 16. Specifically, when a logic level (logic value) of the first drive signal output from the first AND circuit 16 is L (Low) level, the first driver 17 turns off the first FET 11. When the logic level of the first drive signal output from the first AND circuit 16 is H (High) level, the first driver 17 turns on the first FET 11. The first AND circuit 16 outputs a logical product of the logic level of a motor drive signal Sb output from the controller 13, and the logic level of a blocking signal Se output from the hardware protection circuit 14.

The second driver 19 is connected to a gate of the second FET 12. The second driver 19 turns on and off the second FET 12 in accordance with a second drive signal input from the second AND circuit 18. Specifically, when the logic level of the second drive signal output from the second AND circuit 18 is L level, the second driver 19 turns off the second FET 12. When the logic level of the second drive signal output from the second AND circuit 18 is H level, the second driver 19 turns on the second FET 12. The second AND circuit 18 outputs a logical product of the logic level of an operation input signal Sc output from the first NOT circuit 15, and the logic level of the blocking signal Se output from the hardware protection circuit 14.

The hardware protection circuit 14, as described later, normally sets the logic level of the blocking signal Se to H level. In other words, in each of the first AND circuit 16 and the second AND circuit 18, the logic level of one of the two inputs is normally H level. Therefore, as long as the logic level of the blocking signal Se is H level, the logic level of the output from the first AND circuit 16 varies in accordance with the logic level of the motor drive signal Sb from the controller 13, and the logic level of the output from the second AND circuit 18 varies in accordance with the logic level of the operation input signal Sc from the first NOT circuit 15 (i.e., in accordance with the operating state of the operation switch 6). On the other hand, when the logic level of the blocking signal Se from the hardware protection circuit 14 becomes L level, the motor drive signal Sb or the operation input signal Sc is disabled in each of the first AND circuit 16 and the second AND circuit 18, and the logic levels of both the drive signals output from the first AND circuit 16 and the second AND circuit 18 become L level.

The regulator 20 is a power supply circuit that steps down the battery voltage VB supplied from the battery 40 to a control voltage Vc of a predetermined voltage that is lower than the battery voltage VB, and supplies the control voltage Vc to each part of the control circuit 5. The control voltage Vc generated in the regulator 20 is used as an operating power source for each part of the control circuit 5.

The voltage detection circuit 21 acquires the battery voltage VB of the battery 40, and outputs a voltage detection signal indicating a value of the battery voltage VB to the controller 13. The current detection circuit 22 acquires a voltage between both ends of the current sensing resistor R0 to detect a value of a current (hereinafter referred to as "motor current") flowing through the motor 4 based on the voltage, and outputs a current detection signal indicating the detected value to the controller 13.

The controller 13 comprises a microcomputer having a CPU 13*a* and a not shown memory. The controller 13 outputs the motor drive signal Sb for driving the motor 4 in accordance with the operating state of the operation switch 6. To the controller 13, a voltage at one end of the operation switch 6 is input as an operation signal Sa indicating the operating state of the operation switch 6.

The logic level of the operation signal Sa becomes H level when the operation switch 6 is turned off, due to a configuration of an input side of the hardware protection circuit 14 to be described later (see FIG. 2). When the operation switch 6 is turned on, the logic level of the operation signal Sa becomes L level.

The controller 13, when the logic level of the operation signals Sa input from the operation switch 6 is H level (that is, when the operation switch 6 is turned off), sets the logic level of the motor drive signal Sb to L level, and, when the logic level of the operation signal Sa is L level (that is, when the operation switch 6 is turned on), sets the logic level of the motor drive signal Sb to H level.

The first NOT circuit 15 logically inverts the operation signal Sa input from the operation switch 6 and outputs the logically-inverted operation signal Sa as the operation input signal Sc. While the operation switch 6 is turned off and the logic level of the operation signal Sa is H level, the logic level of the operation input signal Sc output from the first NOT circuit 15 becomes L level. On the other hand, when the operation switch 6 is turned on and the logic level of the operation signal Sa becomes L level, the logic level of the operation input signal Sc output from the first NOT circuit 15 becomes H level.

Thus, when the operation switch 6 is turned on and the logic levels of both the motor drive signal Sb and the operation input signal Sc become H level, the first FET 11 and the second FET 12 are turned on to flow a current to the motor 4 and the motor 4 is rotated, under the normal condition that the logic level of the blocking signal Sc from the hardware protection circuit 14 is H level.

The controller 13 has a protection function to set the logic level of the motor drive signal Sb to L level, irrespective of the operating state of the operation switch 6, to forcibly stop the motor 4, if a predetermined protection condition is satisfied while the controller 13 is outputting the motor drive signal Sb of H level and rotating the motor 4.

In the first embodiment, there are at least three protection conditions. One of the protection conditions is that the battery 40 is over-discharged. The controller 13 monitors the battery voltage VB based on the voltage detection signal input from the voltage detection circuit 21, and, when the value of the battery voltage VB is equal to or lower than a preset voltage value, determines that the battery 40 is over-discharged. The controller 13, if it determines that the battery 40 is over-discharged during rotation of the motor 4, sets the logic level of the motor drive signal Sb to L level, irrespective of the operating state of the operation switch 6, to stop the rotation of the motor 4.

Another one of the protection conditions is that the motor current flowing through the motor 4 becomes an over-current state. The controller 13 monitors the motor current based on the current detection signal input from the current detection circuit 22, and, when the value of the motor current is equal to or greater than a preset current value, determines that the motor current is in an over-current state. The controller 13, if it determines that the motor current is in an over-current state during rotation of the motor 4, sets the logic level of the motor drive signal Sb to L level, irrespective of the operating state of the operation switch 6, to stop the rotation of the motor 4.

Further another one of the protection conditions is that an external stop signal St is input to the controller 13. The external stop signal St is a signal that indicates a state to stop the driving of the motor 4 and is input from outside of the control circuit 5, or from outside of the tool body 2.

Specific illustration on particularly from where the external stop signal St is input is omitted in FIG. 1. For example, a switch operable by the user may be provided in a housing of the tool body 2, and the external stop signal St may be input to the controller 13 if the switch is operated. Further, for example, when a not shown control circuit provided in the battery 40 detects an abnormality of the battery 40 or other abnormalities inside the battery pack 3, the not shown control circuit may output the external stop signal St to the tool body 2.

The controller 13 activates the protection function if any one of the plurality of protection conditions is satisfied after the motor 4 starts to be driven. That is, even if the operation switch 6 is turned on, the controller 13 sets the logic level of the motor drive signal Sb to L level and stops the rotation of the motor 4. The controller 13, when it activates the protection function and sets the logic level of the motor drive signal Sb to L level, maintains the logic level of the motor drive signal Sb at L level until the operation switch 6 is turned off once and is turned on again. Output control of the motor drive signal Sb and operation control of the protection function by the controller 13 are both carried out by the CPU 13*a* in accordance with a program stored in the memory.

The hardware protection circuit 14 monitors whether the protection function by the controller 13 is activated after the operation switch 6 is turned on and the motor 4 starts to rotate, as its primary function.

To the hardware protection circuit 14, the operation signal Sa is input from the operation switch 6, and a voltage at one end of the motor 4 (in other words, a voltage at a source side of the first FET 11) is input as a motor state signal Sd. The motor state signal Sd is a signal indicating the operating state of the motor 4. That is, when the first FET 11 and the second FET 12 are both turned off and the motor 4 is stopped, the logic level of the motor state signal Sd becomes L level. On the other hand, when the first FET 11 and the second FET 12 are both turned on to flow a current from the battery 40 to the motor 4 and the motor 4 is rotated, a voltage applied to the motor 4 becomes a voltage substantially equal to the battery voltage VB (voltage capable of driving the motor 4) and the logic level of the motor state signal Sd becomes H level. Therefore, the operating state of the motor 4 (whether the motor 4 is rotating) can be determined by monitoring the logic level of the motor state signal Sd. When the logic level of, the motor state signal Sd is L level, it can be determined that the motor 4 is stopped. Therefore, if the logic level of the motor state signal Sd becomes L level after the motor 4 starts to rotate, it can be determined that a motor stop condition that is a condition under which the motor 4 stops (condition that directly or indirectly indicates that the motor 4 is stopped) is satisfied.

The hardware protection circuit 14, based on the logic levels of the operation signal Sa and the motor state signal Sd, determines whether the protection function by the controller 13 is activated. Specifically, if the operation switch 6 is turned on and the motor 4 is rotating, the logic level of the operation signal Sa is L level and the logic level of the motor state signal Sd is H level. Thereby, it is determined that the protection function is not activated and the electric power tool 1 is operating normally. In this case, the hardware protection circuit 14 sets the logic level of the blocking signal Se to H level.

On the other hand, when the protection function by the controller 13 is activated and the first FET 11 is turned off, a current to the motor 4 is cut off to stop the motor 4 and the logic level of the motor state signal Sd becomes L level. In this case, the hardware protection circuit 14 determines that the protection function by the controller 13 is activated since the logic level of the motor state signal Sd becomes L level although the logic level of the operation signal Sa is L level (that is, rotation of the motor 4 is stopped although the operation switch 6 is turned on). In this case, the hardware protection circuit 14 sets the logic level of the blocking signal Se to L level.

When the logic level of the blocking signal Se output from the hardware protection circuit 14 becomes L level, and even if some abnormality thereafter occurs to the controller 13 and the controller 13 malfunctions and accidentally sets the logic level of the motor drive signal Sb to H level, irrespective of a state in which activation of the protection function should be continued, the motor drive signal Sb is disabled by the blocking signal Se in the first AND circuit 16, and the first FET 11 is not turned on.

Figure 2:
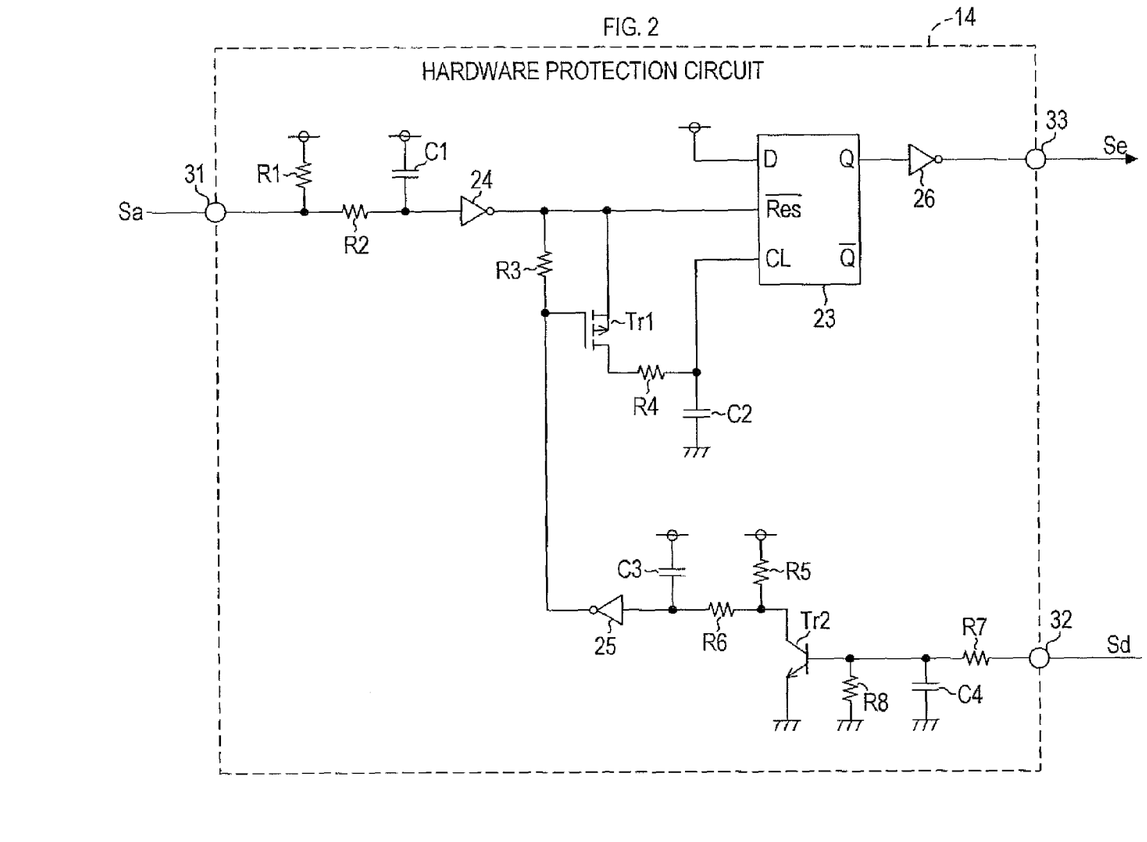
FIG. 2 is a circuit diagram showing a detailed configuration of a hardware protection circuit.

A specific configuration example of the hardware protection circuit 14 is shown in FIG. 2. As shown in FIG. 2, the hardware protection circuit 14 of the first embodiment mainly comprises a D-type flip-flop (hereinafter "D-FF") 23 having a reset terminal, a first input terminal 31, a second input terminal 32, and an output terminal 33. To the first input terminal 31, the operation signal Sa from the operation switch 6 is input. To the second input terminal 32, the motor state signal Sd is input. From the output terminal 33, the blocking signal Se is output.

In the hardware protection circuit 14, one end of the resistor R1 and one end of the resistor R2 are connected to the first input terminal 31. The control voltage Vc is applied to the other end of the resistor R1. An input side of the second NOT circuit 24 and one end of a capacitor C1 are connected to the other end of the resistor R2. The control voltage Vc is applied to the other end of the capacitor C1.

An output terminal of the second NOT circuit 24 is connected to an inverting reset input terminal of the D-FF 23, and is also connected to one end of a resistor R3 and a source of a first transistor Tr1. The first transistor Tr1, in the first embodiment, is a p-channel MOSFET. The other end of the resistor R3 is connected to a gate of the first transistor Tr1. A drain of the first transistor Tr1 is connected to one end of a resistor R4. The other end of the resistor R4 is connected to one end of a clock input terminal of the D-FF 23 and one end of a capacitor C2. The other end of the capacitor C2 is connected to the ground line.

One end of a resistor R7 is connected to the second input terminal 32. The other end of the resistor R7 is connected to one end of a capacitor C4, one end of a resistor R8, and a base of a second transistor Tr2. Other ends of the capacitor C4 and the resistor R8 are connected to the ground line. The second transistor Tr2, in the first embodiment, is an NPN bipolar transistor.

An emitter of the second transistor Tr2 is connected to the ground line. A collector of the second transistor Tr2 is connected to one end of a resistor R5 and one end of a resistor R6. The control voltage Vc is applied to the other end of the resistor R5. The other end of the resistor R6 is connected to an input side of a third NOT circuit 25 and one end of a capacitor C3. The control voltage Vc is applied to the other end of the capacitor C3. An output terminal of the third NOT circuit 25 is connected to the gate of the first transistor Tr1.

The D-FF 23 comprises a data input terminal, an output terminal, an inverting output terminal, a clock input terminal, and the inverting reset input terminal. The control voltage Vc is input to the data input terminal as an input signal (input D). Therefore, the logic level of the input D of the D-FF 23, as long as the control voltage Vc is generated by the regulator 20, is always H level.

From the output terminal Q, the logic level of the input D at the time when the logic level of a clock signal (clock input CL) input to the clock input terminal changes from L level to H level is output as an output Q. The logic level of the output Q is reset to L level, each time the logic level of an inverting reset signal Res input to the inverting reset input terminal (i.e., output signal from the second NOT circuit 24) changes from H level to L level.

The output Q of the D-FF 23 is logically inverted by a fourth NOT circuit 26. The logically inverted signal is output from the hardware protection circuit 14 to the first AND circuit 16 and the second AND circuit 18, as the blocking signal Se.

With this configuration, when the operation switch 6 is turned on, the first input terminal 31 of the hardware protection circuit 14 is connected to the ground line through the operation switch 6. Thereby, the logic level of the operation signal Sa becomes L level. On the other hand, when the operation switch 6 is turned off, the control voltage Vc is applied to the first input terminal 31 of the hardware protection circuit 14 through the resistor R1. Thereby, the logic level of the operation signal Sa becomes H level. That is, since the voltage of one end of the operation switch 6 is pulled up to the control voltage Vc through the resistor R1 inside the hardware protection circuit 14, the logic level of the voltage at the one end of the operation switch 6 (i.e., operation signal Sa) changes to H level or L level, depending on the operating state of the operation switch 6.

(2) Operation Example of Electric Power Tool 1

Figure 3:
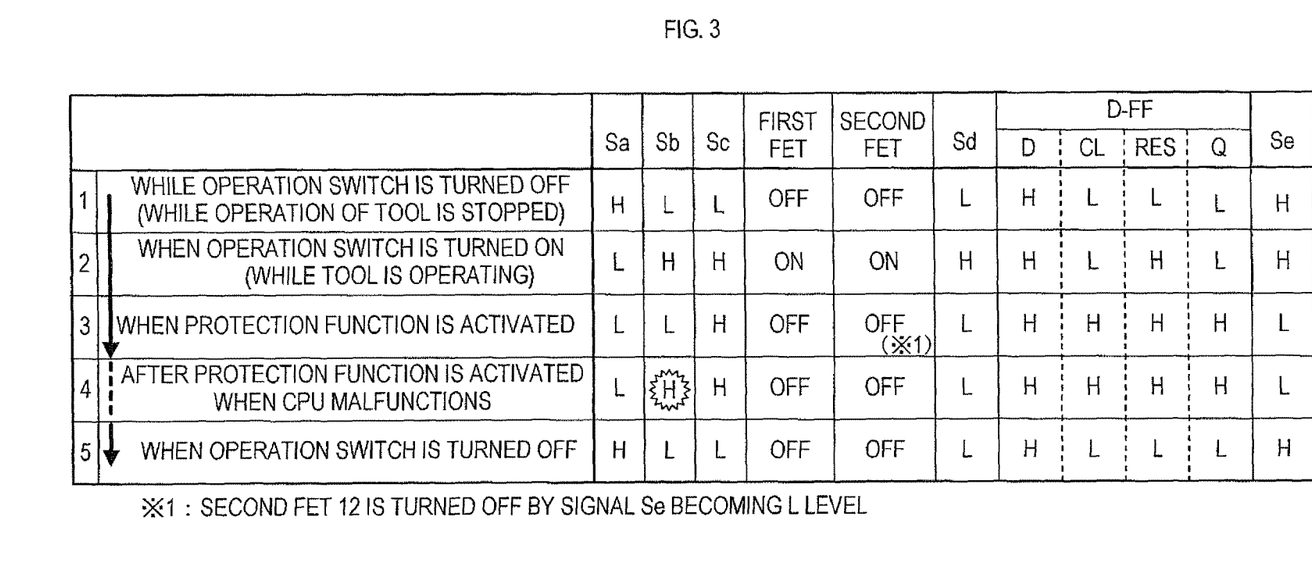
FIG. 3 is an explanatory diagram for explaining an operation example of the motor driven appliance of the first embodiment.

An operation example of the electric power tool 1 will be described with reference to FIG. 3. FIG. 3 shows variations of each part (each signal and the first FET 11 and the second FET 12) of the tool body 2, in a series of operations from a state in which the operation switch 6 is turned off to a state in which the operation switch 6 is turned on to rotate the motor 4 and thereafter turned off again.

First, a state in which the operation switch 6 is turned off and the motor 4 is stopped (hereinafter referred to as "first state") will be described. As shown in FIG. 3, in the first state, the logic level of the operation signal Sa is H level. Therefore, the logic level of the motor drive signal Sb from the controller 13 becomes L level, and the logic level of the operation input signal Sc from the first NOT circuit 15 becomes L level. At this time, the motor 4 is stopped since the first FET 11 and the second FET 12 are turned off. Thus, the logic level of the motor state signal Sd is L level.

Inside the hardware protection circuit 14, when the logic level of the operation signal Sa is H level, the logic level of the output of the second NOT circuit 24 becomes L level, and the logic level of the inverting reset input Res of the D-FF 23 becomes L level. Further, since the logic level of the motor state signal Sd input to the second input terminal 32 is L level, the second transistor Tr2 is turned off. Therefore, the logic level of the input of the third NOT circuit 25 becomes H level, and the logic level of the output of the third NOT circuit 25 becomes L level.

Thus, the first transistor Tr1 is turned off, and the logic level of the clock input CL of the D-FF 23 becomes L level. As will be described later, after the operation switch 6 is turned on and the motor 4 starts to be driven, and if the operation switch 6 is again turned off, the D-FF 23 is reset, and the logic level of the output Q becomes L level. Therefore, in the first state in which the operation switch 6 is turned off and the motor 4 is stopped, normally the logic level of the output Q of the D-FF 23 becomes L level, so the logic level of the blocking signal Se that is an output signal from the hardware protection circuit 14 becomes H level. In the first state, the blocking signal Se at H level is input to the first AND circuit 16 and the second AND circuit 18. Therefore, in the first state, the other signal input to each of the first AND circuit 16 and the second AND circuit 18 is enabled, and the logic level of the output signal of each of the first AND circuit 16 and the second AND circuit 18 changes according to the logic level of the other signal.

Now, a state in which the operation switch 6 is turned on and the electric power tool 1 has started to operate (the motor 4 has started to rotate) (hereinafter referred to as "second state"), migrated from the first state, to will be described. As shown in FIG. 3, in the second state, the logic level of the operation signal Sa changes to L level. Therefore, the logic level of the motor drive signal Sb from the controller 13 becomes H level, and the logic level of the operation input signal Sc from the first NOT circuit 15 also becomes H level.

Therefore, the logic level of each of the drive signals output from the first AND circuit 16 and the second AND circuit 18 becomes H level. Thus, the first FET 11 and the second FET 12 are turned on to flow a current from the battery 40 to the motor 4, and the motor 4 is rotated. When the first FET 11 and the second FET 12 are turned on and the motor 4 is rotating, the logic level of the motor state signal Sd becomes H level.

Inside the hardware protection circuit 14, when the logic level of the motor state signal Sd input to the second input terminal 32 becomes H level, the second transistor Tr2 is turned on. Therefore, the logic level of the input of the third NOT circuit 25 becomes L level, and the logic level of the output of the third NOT circuit 25 becomes H level. Further, since the logic level of the operation signal Sa input to the first input terminal 31 becomes L level, the logic level of the output of the second NOT circuit 24 becomes H level, and the logic level of the inverting reset input Res of the D-FF 23 becomes H level.

Because the logic levels of the outputs of the second NOT circuit 24 and the third NOT circuit 25 are both H level, the first transistor Tr1 remains turned off, and the logic level of the clock input CL of the D-FF remains at L level. Therefore, the logic level of the output Q of the D-FF 23 is not changed and remains at L level, and the logic level of the blocking signal Se output from the hardware protection circuit 14 remains at H level. Thus, in this second state, the first FET 11 and the second FET 12 remain turned on, and the motor 4 continues to rotate.

Now, a state in which the protection function is activated in the controller 13 by occurrence of over-current or over-discharge or an input of the external stop signal St when in the second state (hereinafter referred to as "third state") will be described. As shown in FIG. 3, in the third state, since the operation switch 6 still remains turned on, the logic level of the operation signal Sa is L level.

On the other hand, the logic level of the motor drive signal Sb output from the controller 13 is switched to L level due to activation of the protection function. When the logic level of the motor drive signal Sb becomes L level, the first FET 11 is turned off to cut off a current to the motor 4 and the motor 4 is stopped. When the first FET 11 is turned off and the motor 4 is stopped, the logic level of the motor state signal Sd becomes L level.

Inside the hardware protection circuit 14, when the logic level of the motor state signal Sd input to the second input terminal 32 becomes L level, the second transistor Tr2 is turned off, and the logic level of the input of the third NOT circuit 25 becomes H level, and the logic level of the output of the third NOT circuit 25 becomes L level. That is, the logic level of the gate of the first transistor Tr2 becomes L level. On the other hand, since the logic level of the operation signal Sa input to the first input terminal 31 remains at L level as described above, the logic level of the output of the second NOT circuit 24 remains at H level. Therefore, the first transistor Tr2 is turned on, and the logic level of the clock input CL of the D-FF 23 rises to H level.

When the logic level of the clock input CL of the D-FF 23 rises to H level, the logic level of the output Q of the D-FF 23 becomes H level that is the logic level of the input D at that time. When the logic level of the output Q becomes H level, the logic level of the output of the fourth NOT circuit 26 becomes L level, and accordingly the logic level of the blocking signal Se output from the hardware protection circuit 14 becomes L level, and the blocking signal Se of L level is input to the first AND circuit 16 and the second AND circuit 18.

Thus, the other signals input to the first AND circuit 16 and the second AND circuit 18 are both disabled, and the logic levels of both the drive signals from the first AND circuit 16 and the second AND circuit 18 are forcibly set to L level. Thus, from a state in which the first FET 11 is turned off due to the protection function by the controller 13, the second FET 12 is further turned off, and then a state is achieved in which the first FET 11 and the second FET 12 are both turned off.

Thus, when the protection function by the controller 13 is activated and the motor 4 is stopped, the hardware protection circuit 14 detects the activation of the protection function from conflicting relationship of the two input signals Sa and Sd, that is, the motor 4 being stopped although the operation switch 6 is turned on. When detecting the activation of the protection function, the hardware protection circuit 14 sets the logic level of the blocking signal Se to L level to forcibly turn off the first FET 11 and the second FET 12.

Now, a state in which, after activation of the protection function by the controller 13, the controller 13 malfunctions and the logic level of the motor drive signal Sb is changed to H level although the operation switch 6 remains turned on (hereinafter, "fourth state") will be explained.

As shown in FIG. 3, when the logic level of the motor drive signal Sb changes to H level due to malfunction of the controller 13, the motor drive signal Sb of H level is input to the first AND circuit 16. However, at this time, since the logic level of the blocking signal Se output from the hardware protection circuit 14 is L level, the logic level of the first drive signal output from the first AND circuit 16 remains at L level, and the first PET 11 remains turned off. In other words, even if the controller 13 malfunctions after activation of the protection function, the stopped state of the motor 4 is maintained by the blocking signal Se from the hardware protection circuit 14.

In the third state, in addition to that the hardware protection circuit 14 forcibly turns off the first FET 11 and the second FET 12, the controller 13 also sets the logic level of the motor drive signal Sb to L level to turn off the first FET 11.

Therefore, in addition to the change to the above fourth state, for example, even if some abnormality occurs in the hardware protection circuit 14 and the logic level of the blocking signal Se becomes H level, the stopped state of the motor 4 is maintained as long as the controller 13 is normal (i.e., as long as the protection function is activated properly and the motor drive signal Sb of L level is being output). Further, for example, even if a short-circuit failure occurs to one of the first FET 11 and the second FET 12, the stopped state of the motor 4 is maintained as long as the other is turned off by the drive signal Sb of L level or the blocking signal Se of L level.

Now, a state in which the user has turned off the operation switch 6 (hereinafter referred to as "fifth state"), migrated from the third state or the fourth state, will be described. As shown in FIG. 3, in the fifth state, the operation switch 6 is turned off, and accordingly the logic level of the operation signal Sa becomes H level. Therefore, the logic level of the motor drive signal Sb from the controller 13 becomes L level, and the logic level of the operation input signal Sc from the first NOT circuit 15 becomes L level.

When the logic level of the operation signal Sa becomes H level, the hardware protection circuit 14 operates as follows. That is, inside the hardware protection circuit 14, when the logic level of the operation signal Sa becomes H level, the logic level of the output of the second NOT circuit 24 becomes L level, and the logic level of the inverting reset input Res of the D-FF 23 changes from H level to L level. Therefore, the logic level of the output Q of the D-FF 23 is reset to L level.

When the logic level of the output Q is reset to L level, the logic level of the blocking signal Se output from the hardware protection circuit 14 becomes H level, and accordingly, disablement of the motor drive signal Sb in the first AND circuit 16 and disablement of the operation input signal Sc in the second AND circuit 18 by the blocking signal Se are both released. In the fifth state, since the logic level of the output of the second NOT circuit 24 becomes L level and the first transistor Tr1 is turned off, the logic level of the clock input CL of the D-FF 23 becomes L level.

In the fourth state, that is, when the state in which the controller 13 malfunctions is continued, it is likely that the logic level of the motor drive signal from the controller 13 is maintained at H level even if the operation switch 6 is turned off. However, in this case, since at least the second FET 12 is turned off by turning-off of the operation switch 6, the stopped state of the motor 4 is maintained.

As above, the hardware protection circuit 14, after setting the logic level of the blocking signal Se to L level by activation of the protection function by the controller 13, maintains (latches) the logic level of the blocking signal Se at L level until the operation switch 6 is turned off and forcibly turns off the first FET 11 and the second FET 12. When the operation switch 6 is turned off, the hardware protection circuit 14 releases the state to maintain the logic level of the blocking signal Se at L level. Therefore, by turning on the operation switch 6 again after the operation switch 6 is once turned off, it is possible to rotate the motor 4 to make available the electric power tool 1.

(3) Effect, Etc. of First Embodiment

As described above, in the electric power tool 1 of the first embodiment, the controller 13 has the protection function. The controller 13, when the operation switch 6 is turned on, sets the logic level of the motor drive signal Sb to H level to drive the motor 4. After the motor 4 starts to be driven, and when the protection condition is satisfied, that is, over-current or over-discharge is detected or when the external stop signal St is input, the controller 13 activates the protection function. That is, the controller 13, irrespective of the state of the operation switch 6, sets the logic level of the motor drive signal Sb to L level to turn off the first FET 11 and stop the motor 4.

The electric power tool 1, separately from the controller 13, comprises the hardware protection circuit 14 configured by hardware (logic circuit). The hardware protection circuit 14, when it detects that the protection function is activated by the controller 13, sets the logic level of the blocking signal Se to L level to forcibly keep both the first FET 11 and second FET 12 turned off.

Therefore, after activation of the protection function by the controller 13, even if the controller 13 malfunctions for some reason and the logic level of the motor drive signal Sb becomes H level, the stopped state of the motor 4 is maintained. Also, after activation of the protection function, for example, even if one of the first FET 11 and the second FET 12 has a short circuit failure, the stopped state of the motor 4 is maintained as long as the other is normal. Further, after activation of the protection function, even if the hardware protection circuit 14 malfunctions for some reason and the logic level of the blocking signal Se returns to H level, the stopped state of the motor 4 is maintained as long as the controller 13 is normal.

As above, in the electric power tool 1 of the first embodiment, the first FET 11 and the second FET 12 connected in series to each other are provided on the current path from the battery 40 to the motor 4, and the first FET 11 is controlled by the controller 13. When the protection function is activated, the first FET 11 is turned off by the controller 13, and both the first FET 11 and the second FET 12 are forcibly kept turned off by the hardware protection circuit 14. Therefore, after activation of the protection function by the controller 13, it is possible to maintain the stopped state of the motor 4 more successfully, and to provide the reliable electric power tool 1 that is highly reliable.

The hardware protection circuit 14, based on states of two monitored objects inside the electric power tool 1, monitors the operating state of the protection function by the controller 13. Specifically, the hardware protection circuit 14 monitors the operating state of the motor 4 and the operating state of the operation switch 6, and, if the motor 4 satisfies the motor stop condition, and the operation switch 6 is turned on, determines that the protection function by the controller 13 is activated.

In other words, the hardware protection circuit 14 is configured to determine that the protection function by the controller 13 is activated, if it detects that the motor 4 is stopped although the operation switch 6 is turned on after the motor 4 starts to be driven. Therefore, the hardware protection circuit 14, after the motor 4 starts to be driven, can more properly monitor whether the protection function by the controller 13 is activated (and whether to set the logic level of the blocking signal Se to L level).

The hardware protection circuit 14, if it detects activation of the protection function by the controller 13 and sets the logic level of the blocking signal Se to L level after the motor 4 starts to be driven, maintains the logic level of the blocking signal Se at L level until the operation switch 6 is turned off thereafter. When the operation switch 6 is turned off, the hardware protection circuit 14 returns the logic level of the blocking signal Se to H level. Therefore, after activation of the protection function by the controller 13, it is possible to properly maintain the stopped state of the motor 4, and make available the electric power tool 1 again and at appropriate timing.

In the present embodiment, the electric power tool 1 corresponds to an example of a motor driven appliance of the present disclosure, the battery 40 corresponds to an example of a power source of the present disclosure, the first FET 11 corresponds to an example of a first switching element of the present disclosure, the second FET 12 corresponds to an example of a second switching element of the present disclosure, the operation switch 6 corresponds to an example of an operation unit of the present disclosure, the controller 13 corresponds to an example of a control unit of the present disclosure, the motor drive signal Sb of H level output from the controller 13 corresponds to an example of a control signal of the present disclosure, the hardware protection circuit 14 corresponds to an example of a monitoring unit of the present disclosure, the blocking signal Se of L level output from the hardware protection circuit 14 corresponds to an example of an OFF signal of the present disclosure, the first AND circuit 16 corresponds to an example of a forcing turn-off unit of the present disclosure, the operation of the operation switch 6 from an ON state to an OFF state corresponds to an example of a release condition of the present disclosure, and the motor state signal Sd corresponds to an example of a first monitored object of the present disclosure.

Second Embodiment

Figure 4:
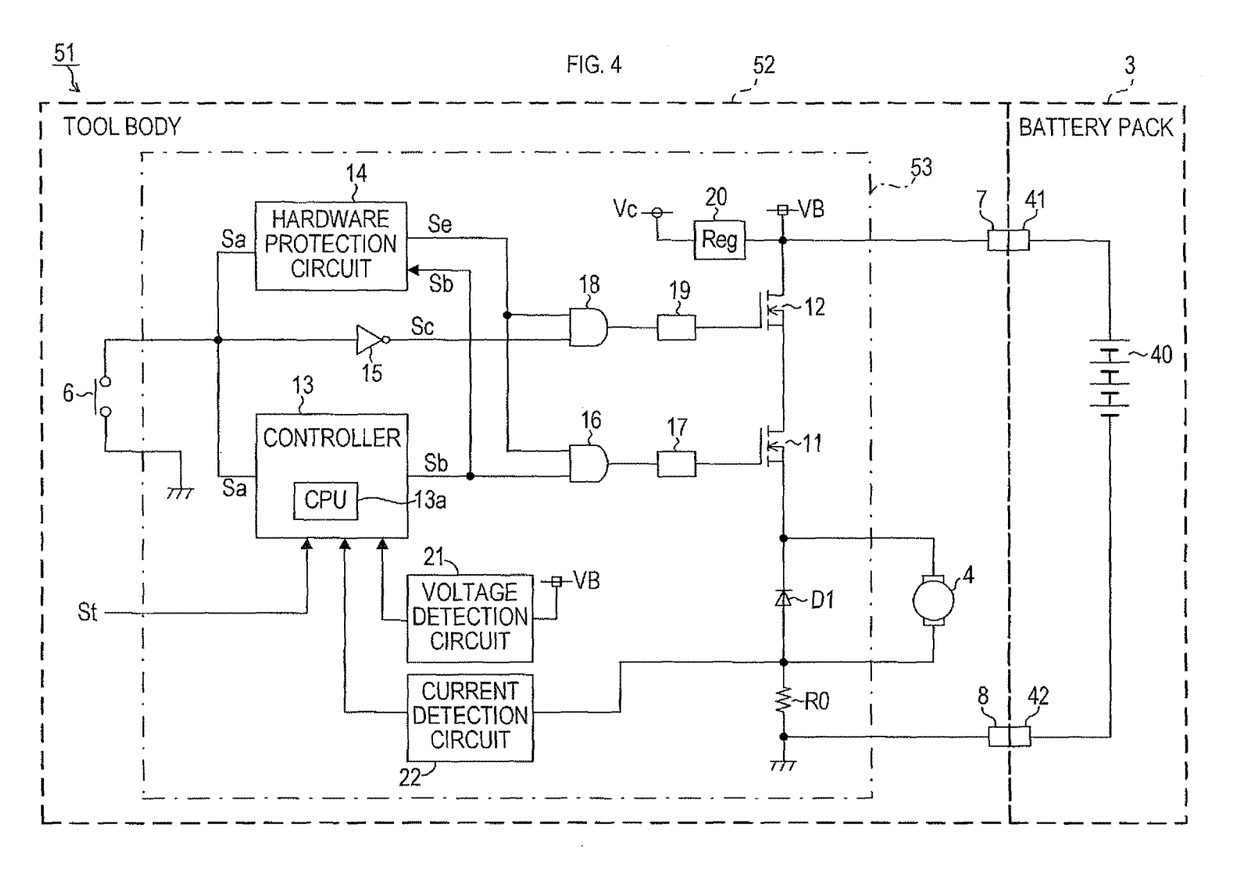
FIG. 4 is a circuit diagram showing a configuration of a motor driven appliance of a second embodiment.

Referring to FIG. 4, an electric power tool 51 of the second embodiment will be described. The electric power tool 51 of the second embodiment shown in FIG. 4 is partly different in configuration of a control circuit 53 of a tool body 52, as compared to the electric power tool 1 of the first embodiment shown in FIG. 1.

Specifically, whereas the signal input to the second input terminal 32 of the hardware protection circuit 14 in the first embodiment is the motor state signal Sd, the signal in the second embodiment is the motor drive signal Sb output from the controller 13. Except that the signal input to the second input terminal 32 of the hardware protection circuit 14 is different, the electric power tool 51 is the same as the electric power tool 1 of the first embodiment.

If the logic level of the motor drive signal Sb becomes H level, it can be determined that the motor 4 is rotating. On the other hand, if the logic level of the motor drive signal Sb becomes L level, the logic level of the first drive signal from the first AND circuit 16 becomes L level to turn off the first FET 11 and the motor 4 is stopped. Therefore, that the logic level of the motor drive signal Sb becomes L level can be regarded as one of the motor stop conditions.

Therefore, in the second embodiment, the hardware protection circuit 14 indirectly determines that the motor 4 is stopped, i.e., whether the motor stop condition is satisfied, from the motor drive signal Sb.

In the electric power tool 51 thus configured of the second embodiment, when the operation switch 6 is turned on and the motor 4 is rotating, and if the protection function by the controller 13 is activated and the logic level of the motor drive signal Sb becomes L level, the motor drive signal Sb of L level is input to the second input terminal 32 of the hardware protection circuit 14. This state is equivalent to the state in the first embodiment in which the protection function is activated to stop the motor 4 and the logic level of the motor state signal Sd becomes L level. In other words, it is equivalent to the third state shown in FIG. 3.

Therefore, the hardware protection circuit 14, after the operation switch 6 is turned on and the motor 4 has normally started driving, and when the protection function by the controller 13 is activated and the logic level of the motor drive signal Sb becomes L level, detects the activation of the protection function and sets the logic level of the blocking signal Se to L level. That is, in the second embodiment, the hardware protection circuit 14 detects the activation of the protection function from conflicting relationship of the two input signals Sa and Sb, that is, the logic level of the motor drive signal Sb becoming L level although the operation switch 6 is turned on (i.e. the motor 4 is stopped). When detecting the activation of the protection function, the hardware protection circuit 14 sets the logic level of the blocking signal Se to L level to forcibly turn off the first FET 11 and the second FET 12, thereby to prevent the motor 4 from being rotated even if the controller 13 malfunctions.

Accordingly, in the electric power tool 51 of the second embodiment, the hardware protection circuit 14, based on the operating state of the operation switch 6 and the motor drive signal Sb, can properly monitor whether the protection function by the controller 13 is activated. Therefore, after activation of the protection function by the controller 13, it is possible to maintain the stopped state of the motor 4 more successfully, and to provide the electric power tool 51 that is highly reliable. In the second embodiment, the motor drive signal Sb corresponds to an example of the first monitored object of the present disclosure, and the condition that the logic level of the motor drive signal Sb is L level corresponds to an example of a condition that the control signal is not being output in the present disclosure.

Third Embodiment

Figure 5:
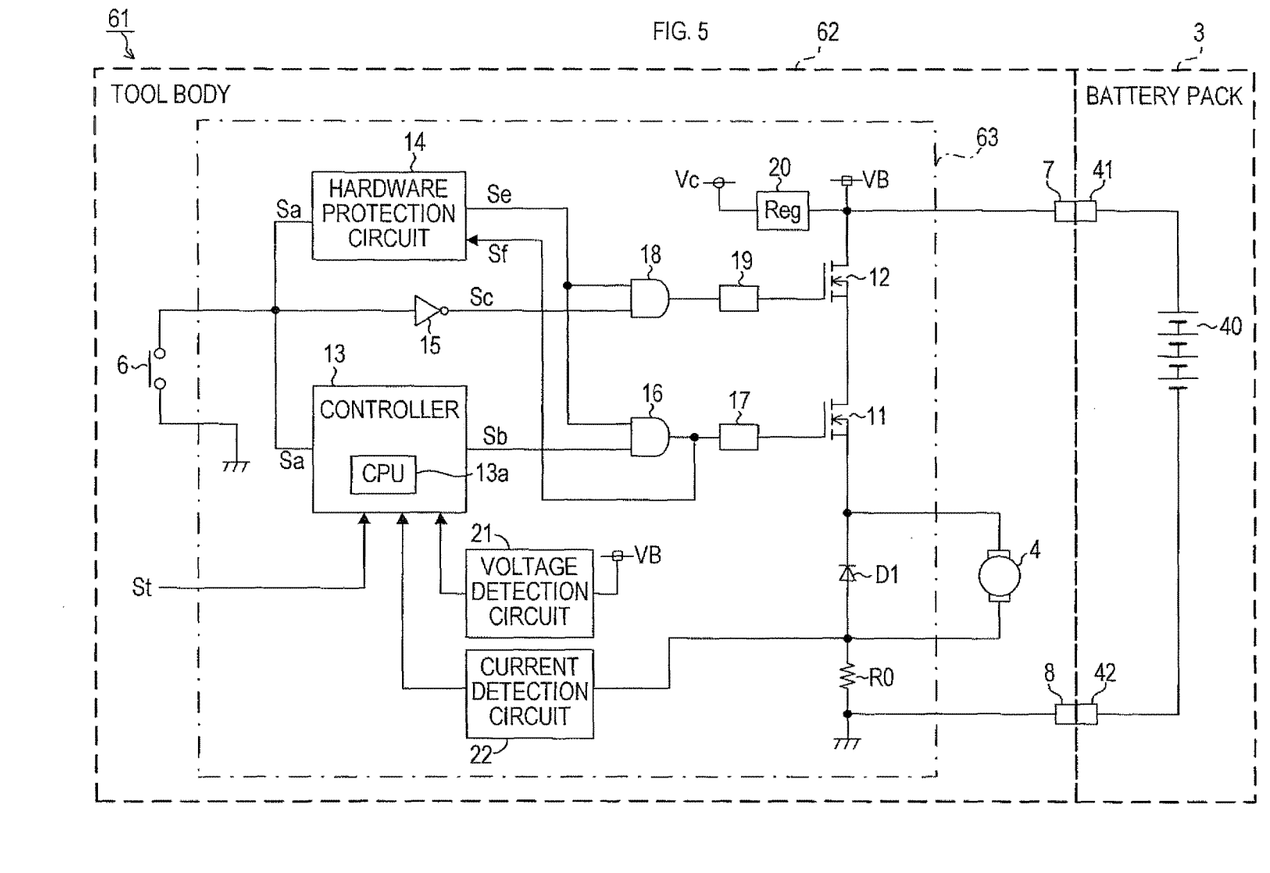
FIG. 5 is a circuit diagram showing a configuration of a motor driven appliance of a third embodiment.

Referring to FIG. 5, an electric power tool 61 of the third embodiment will be described. The electric power tool 61 of the third embodiment shown in FIG. 5 is partly different in configuration of a control circuit 63 of a tool body 62, as compared to the electric power tool 1 of the first embodiment shown in FIG. 1.

Specifically, whereas the signal input to the second input terminal 32 of the hardware protection circuit 14 is the motor state signal Sd in the first embodiment, the signal is the first drive signal Sf output from the first AND circuit 16 in the third embodiment. Except that the signal input to the second input terminal 32 of the hardware protection circuit 14 is different, the electric power tool 61 is the same as the electric power tool 1 of the first embodiment.

If the logic level of the first drive signal Sf output from the first AND circuit 16 is H level, it can be determined that the motor 4 is rotating. On the other hand, if the logic level of the first drive signal Sf is L level, the first FET 11 is turned off to stop the motor 4. Therefore, that the logic level of the first drive signal Sf becomes L level can be regarded as one of the motor stop conditions.

Thus, in the third embodiment, the hardware protection circuit 14 indirectly determines that the motor 4 is stopped, that is, whether the motor stop condition is satisfied, from the first drive signal Sf output from the first AND circuit 16.

In the electric power tool 61 thus configured of the third embodiment, if the protection function by the controller 13 is activated and the logic level of the motor drive signal Sb becomes L level, when the operation switch 6 is turned on and the motor 4 is rotating, the logic level of the first drive signal Sf output from the first AND circuit 16 becomes L level, and the first drive signal Sf of L level is input to the second input terminal 32 of the hardware protection circuit 14. This state is equivalent to the state in the first embodiment in which the protection function is activated to stop the motor 4 and thereby the logic level of the motor state signal Sd becomes L level. In other words, it is equivalent to the third state shown in FIG. 3.

Therefore, the hardware protection circuit 14, after the operation switch 6 is turned on and the motor 4 has started to be normally driven, and when the protection function by the controller 13 is activated and the logic level of the first drive signal Sf from the first AND circuit 16 becomes L level, detects the activation of the protection function and sets the logic level of the blocking signal Se to L level. That is, in the third embodiment, the hardware protection circuit 14 detects the activation of the protection function from conflicting relationship of the two input signals, that is, the logic level of the first drive signal Sf from the first AND circuit 16 becoming L level although the operation switch 6 is turned on (that is, the motor 4 is stopped). When detecting the activation of the protection function, the hardware protection circuit 14 sets the logic level of the blocking signal Se to L level to forcibly turn off the first FET 11 and the second FET 12, thereby to prevent the motor 4 from being rotated even if the controller 13 malfunctions.

In the electric power tool 61 thus configured of the third embodiment, similar to the electric power tool 1 of the first embodiment, whether the protection function by the controller 13 is activated can be properly monitored. Therefore, after activation of the protection function by the controller 13, it is possible to maintain the stopped state of the motor 4 more successfully, and to provide the electric power tool 61 that is highly reliable. In the third embodiment, the first drive signal Sf output from the first AND circuit 16 corresponds to an example of the first monitored object of the present disclosure, and the condition that the logic level of the first drive signal Sf is L level corresponds to an example of the condition that the control signal is not being output in the present disclosure.

Fourth Embodiment

Figure 6:
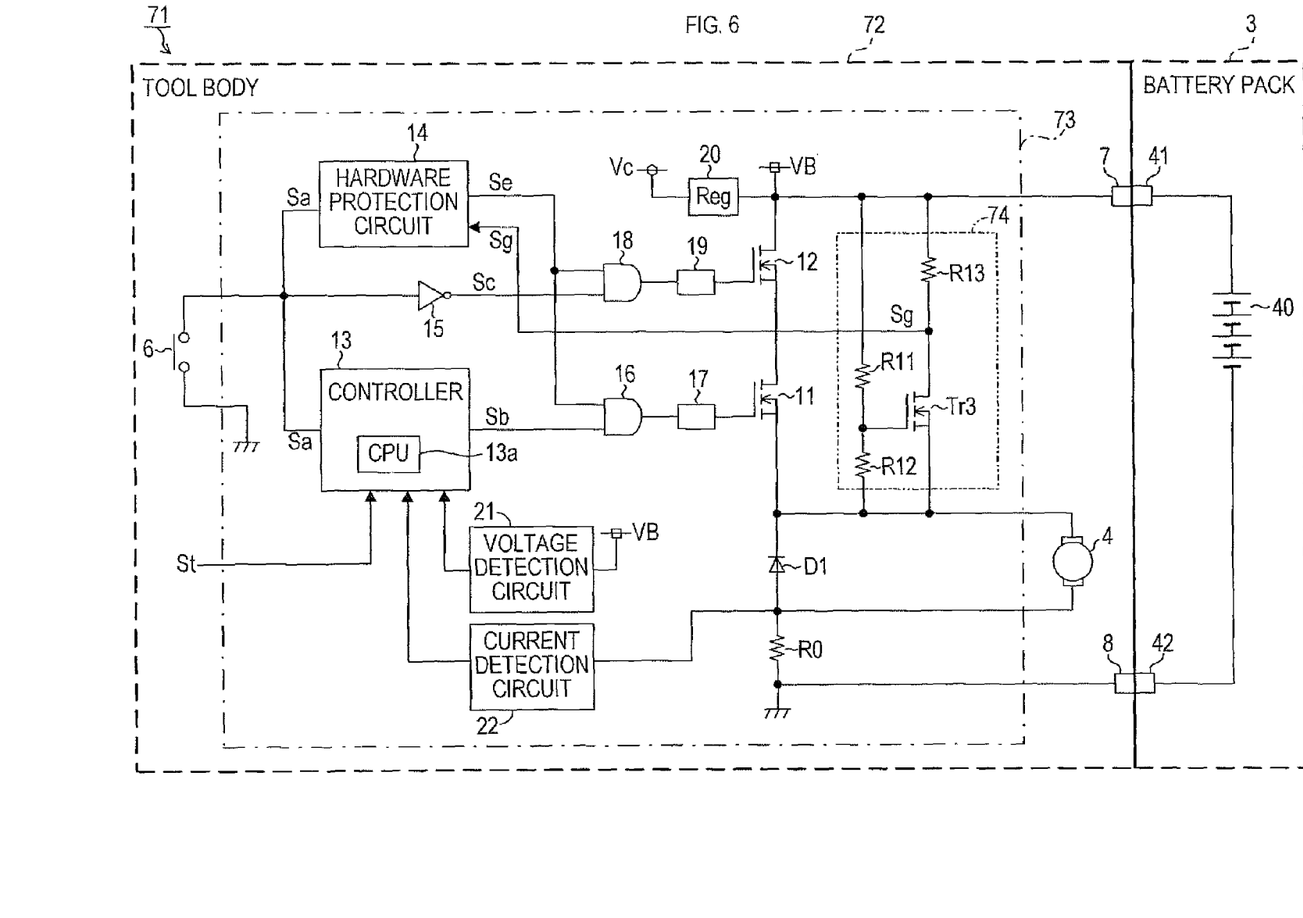
FIG. 6 is a circuit diagram showing a configuration of a motor driven appliance of a fourth embodiment.

Referring to FIG. 6, an electric power tool 71 of the fourth embodiment will be described. The electric power tool 71 of the fourth embodiment shown in FIG. 6 is partly different in configuration of a control circuit 73 of a tool body 72, as compared to the electric power tool 1 of the first embodiment shown in FIG. 1.

The electric power tool 71 of the fourth embodiment comprises a FET operating state detection circuit 74 to indirectly detect whether the motor 4 is rotating. The detection circuit 74 indirectly detects whether the motor 4 is rotating (whether the first FET 11 and the second FET 12 are turned on and the motor 4 is conducted), and directly determines whether a voltage close to the battery voltage VB is applied between the drain and the source of the first FET 11.

If the first FET 11 and the second FET 12 are turned on and the motor 4 is rotating, the voltage applied between the drain and the source of the first FET 11 is approximately zero, and voltage between the source of the first FET 11 and the drain of the second FET 12 is also approximately zero.

On the other hand, after the first FET 11 and the second FET 12 are turned on and the motor 4 starts to rotate, and when the protection function by the controller 13 is activated to turn off the first FET 11, a current to the motor 4 is cut off. At this point, although the first FET 11 is turned off, the second FET 12 remains turned on (assuming that the operation switch 6 is turned on). Therefore, substantially the same voltage as the battery voltage VB is applied between the drain and the source of the first FET 11. The voltage between the source of the first FET 11 and the drain of the second FET 12 is also substantially the same as the battery voltage VB.

Therefore, after the motor 4 is started to be conducted, the voltage between the drain and the source of the first FET 11 may be monitored, and, if the voltage is approximately zero, it can be determined that the motor 4 is rotating. To the contrary, if the voltage is substantially the same voltage as the battery voltage VB, it can be determined that the motor 4 is stopped. In other words, that approximately the same voltage as the battery voltage VB is applied between the drain and the source of the first FET 11 can be regarded as one of the motor stop conditions.

Therefore, in this fourth embodiment, the detection circuit 74 detects the voltage between the drain and the source of the first FET 11 and outputs an FET operation signal Sg of the logic level corresponding to the detection result. The PET operation signal Sg is input to the second input terminal 32 of the hardware protection circuit 14. The hardware protection circuit 14 indirectly determines whether the motor 4 is stopped, i.e., whether the motor stop condition is satisfied, from the logic level of the FET operation signal Sg.

The detection circuit 74, as shown in FIG. 6, comprises a third transistor Tr3, and three resistors R11, R12, and R13. The third transistor Tr3, in the fourth embodiment, is an N-channel MOSFET. A drain of the third transistor Tr3 is connected to one end of the resistor R13. The other end of the resistor R13 is connected to the drain of the second FET 12. A source of the third transistor Tr3 is connected to the source of the first FET 11. A gate of the third transistor Tr3 is connected to one end of each of the resistors R11 and R12. The other end of the resistor R11 is connected to the drain of the second FET 12. The other end of the resistor R12 is connected to the source of the first FET 11. A drain voltage of the third transistor Tr3 is input to the second input terminal 32 of the hardware protection circuit 14, as the FET operation signal Sg.

In the electric power tool 71 thus configured of the fourth embodiment, when the operation switch 6 is turned on and the motor 4 is rotating, the first FET 11 and the second FET 12 are both turned on. Therefore, in the detection circuit 74, a voltage between the gate and the source of the third transistor Tr3 becomes approximately zero, and the third transistor Tr3 is turned off. Thus, the logic level of the FET operation signal Sg output to the hardware protection circuit 14 becomes H level.

On the other hand, during the rotation of the motor 4, when the protection function by the controller 13 is activated and the logic level of the motor drive signal Sb becomes L level, the first FET 11 is turned off, and the motor 4 is stopped. In this case, since the second FET 12 remains turned on, substantially the same voltage as the battery voltage VB is applied between the drain and the source of the first FET 11. Since this state can be detected through the turned-on second FET 12, the detection circuit 74 detects that a voltage approximately equal to the battery voltage VB is applied between the drain and the source of the first FET 11 through the second FET 12.

That is, when the first FET 11 is turned off and the voltage approximately equal to the battery voltage VB is applied between the drain and the source thereof, the voltage applied between the source of the first FET 11 and the drain of the second FET 12 also becomes a voltage approximately equal to the battery voltage VB. Therefore, the third transistor Tr3 is turned on, whereby the drain voltage of the third transistor Tr3, i.e., the logic level of the FET operation signal Sg, becomes L level. The PET operation signal Sg of L level is input to the hardware protection circuit 14.

The state in which the FET operation signal Sg of L level is input to the second input terminal 32 of the hardware protection circuit 14 is equivalent to the state in the first embodiment in which the protection function is activated to stop the motor 4 and the logic level of the motor state signal Sd becomes L level. In other words, it is equivalent to the third state shown in FIG. 3.

Therefore, the hardware protection circuit 14, after the operation switch 6 is turned on and the motor 4 starts to be normally driven, and when the protection function by the controller 13 is activated to turn off the first FET 11 and the logic level of the FET operation signal Sg becomes L level, detects the activation of the protection function, and sets the logic level of the blocking signal Se to L level. That is, in the fourth embodiment, the hardware protection circuit 14 detects the activation of the protection function from conflicting relationship of two input signals Sa and Sg, that is, the logic level of the FET operation signal Sg becoming L level although the operation switch 6 is turned on (i.e., the motor 4 is stopped). When detecting the activation of the protection function, the hardware protection circuit 14 sets the logic level of the blocking signal Se to L level to forcibly turn off the first FET 11 and the second FET 12, thereby to prevent the motor 4 from being rotated even if the controller 13 malfunctions.

To what extent when the voltage between the drain and the source of the first FET 11 has increased the third transistor Tr3 should be to turned on can be appropriately determined by adjusting voltage dividing ratio of the resistors R11 and R12. Therefore, by adjusting the voltage dividing ratio of the resistors R11 and R12 so that the third transistor Tr3 is turned on when the voltage between the drain and the source of the first FET 11 is equal to or greater than a predetermined voltage threshold, the third transistor Tr3 can be turned on at appropriate timing.

The voltage threshold may be at least set to a value greater than the voltage between the drain and the source of the first FET 11 when the first FET 11 and the second FET 12 are turned on and the motor 4 is driven. In other words, the voltage threshold may be set to a value within a range within which it is not normally assumed that the voltage between the drain and the source of the first FET 11 is equal to or greater than the value as long as the motor 4 is driven normally. In the fourth embodiment, the voltage dividing ratio of each of the resistors R11 and R12 is set so that the voltage threshold is a value lower by a predetermined value than a rated value of the battery voltage VB. The third transistor Tr3 is configured to be turned on once the voltage between the drain and the source of the first FET 11 becomes equal to or greater than the threshold voltage.

According to the electric power tool 71 thus configured of the fourth embodiment, whether the protection function by the controller 13 is activated can be properly monitored based on the voltage between the drain and the source of the first FET 11. Therefore, after activation of the protection function by the controller 13, it is possible to maintain the stopped state of the motor 4 more successfully, and to provide the electric power tool 71 that is highly reliable. In the fourth embodiment, the drain of the first FET 11 corresponds to an example of a first terminal of the present disclosure, the source of the first FET 11 corresponds to an example of a second terminal of the present disclosure, and the FET operation signal Sg corresponds to an example of the first monitored object of the present disclosure.

Other Embodiments (1) The configuration of the hardware protection circuit 14 is not limited to the configuration shown in FIG. 2. The two signals input to the hardware protection circuit 14 are not limited to the two signals shown in the first to fourth embodiments. As long as it can be directly or indirectly detected that the operation switch 6 is turned on and the motor 4 is stopped (the motor stop condition is satisfied), based on specifically what signal and information the state of the operation switch 6 and the state of the motor 4 should be detected can be arbitrarily determined. The same applies to what specific circuit configuration the hardware protection circuit has. The hardware protection circuit may have a configuration different from the configurations of the first to fourth embodiments that use the D-FF 23. As long as the operating state of the protection function by the controller 13 can be appropriately monitored based on an input signal, a specific circuit configuration of the hardware protection circuit can be appropriately determined.

The type of the input signal input to the hardware protection circuit is not limited to two types. For example, signals or information indicating the states of three or more monitored objects may be input, and the operating state of the protection function by the controller 13 may be monitored based on the signals or information.

Further, for example, if the operating state of the protection function can be monitored based on one signal or information, the one signal or information may be input, and the operating state of the protection function may be monitored based on the one signal or information. As a specific example, the controller 13 may be configured to be able to output a signal (protection function activation signal) indicating that the protection function is activated during activation of the protection function, and the protection function activation signal may be input to the hardware protection circuit. In such a configuration, the hardware protection circuit can monitor the operating state of the protection function by the controller 13 based on whether the protection function activation signal is input from the controller 13.

(2) Three conditions, in one of which the battery 40 is over-discharged, in another one of which the motor current is in an over-current state, and in the other of which the external stop signal St is input, are exemplified as the protection conditions that the controller 13 activates the protection function, in the above first to fourth embodiments. These protection conditions are merely an example. What condition to set as the protection condition, how many conditions to set, etc., can be appropriately determined.

(3) In the above embodiments, the operation switch 6 is a switch with a lock-on mechanism. The operation switch 6 may be a switch with no lock-on mechanism. In other words, the operation switch 6 may be a switch configured to be turned on during user operation (e.g., press operation), and to be turned off when the user takes his/her hand off the switch (that is, turned on only during the user operation).

(4) In the first to fourth embodiments, the first FET 11 and the second FET 12 are both N-channel MOSFETs, but may be other types of switching elements. Moreover, it is not essential to provide these two switching elements both on high side of the motor 4 (positive electrode side of the battery 40). For example, each one of the switching elements may be provided on the high side and a low side of the motor 4 (negative electrode side of the battery 40) or the two switching elements together may be provided on the low side.

(5) In the first to fourth embodiments, although the controller 13 of the tool body 2 is described as being configured by a microcomputer. The controller 13 is not limited to a microcomputer, and may be configured by, for example, an ASIC or a programmable logic device (such as FPGA), or other various ICs, logic circuits or the like.

(6) The hardware protection circuit 14 of the first to fourth embodiments is configured as a logic circuit, but may be configured by, for example, an ASIC or a programmable logic device, or other various ICs or the like.

(7) While the motor 4 in the first to fourth embodiments is a brushed DC motor, the present disclosure can be applied to an electric power tool with a motor other than a brushed DC motor.

(8) In the first to fourth embodiments, an example is given in which the present disclosure is applied to an electric power tool. The present disclosure is not limited to electric power tools, and is applicable to all kinds of motor driven appliances in which a tool element is driven by a motor. The present disclosure, for example, can be also applied to various electric working machines such as an electric lawn mower or an electric blower. It is also not essential that the tool body and the battery pack are separated (attachable to and detachable from one another). It is also not essential that the power source of the motor is a battery. The present disclosure can be applied also to a motor driven appliance configured such that its motor is driven with a power source other than a battery (for example, commercial AC (alternating current) power source).

(9) The present disclosure is not intended to be limited to specific elements and structures such as shown in the first to fourth embodiments described above, and may take a variety of forms without departing from the scope of the present disclosure. For example, part of the configuration of the first to fourth embodiments described above may be replaced with known configurations having the same function, or may be added to, or replaced with, etc., the configuration of other embodiments, or may be omitted. Further, the first to fourth embodiments described above may be appropriately combined.

What is claimed is:

1. A motor driven appliance comprising:
a motor;
first and second switching elements that are provided on a current path from a power source to the motor, and are connected in series to each other;
an operation unit configured to accept an external operation input for driving the motor;
a control unit configured to activate a control function to output a control signal for turning on the first switching element in accordance with an operating state of the operation unit, and a protection function to stop the output of the control signal irrespective of the operating state of the operation unit when a predetermined protection condition is satisfied while the control signal is being output; and
a monitoring unit configured to monitor an operating state of the protection function by the control unit and, when the protection function is activated, output an OFF signal for turning off the second switching element.

2. The motor driven appliance according to claim 1,
wherein the monitoring unit is configured to monitor the operating state of the protection function based on states of at least two monitored objects in the motor driven appliance.

3. The motor driven appliance according to claim 2,
wherein a first monitored object of the at least two monitored objects is a monitored object that changes its state in accordance with the operating state of the motor, and
the monitoring unit is configured to output the OFF signal, after the motor starts to be driven, and when the first monitored object is in a state that satisfies a motor stop condition that is a condition under which the motor stops and when a second monitored object of the at least two monitored objects is in a specific state.

4. The motor driven appliance according to claim 3,
wherein the second monitored object is the operation unit, and
the specific state comprises a state in which a predetermined operation for driving the motor is made to the operation unit.

5. The motor driven appliance according to claim 3,
wherein the motor stop condition comprises a condition that no voltage is applied to the motor necessary to drive the motor.

6. The motor driven appliance according to claim 3,
wherein the motor stop condition comprises a condition that the control signal is not being output from the control unit.

7. The motor driven appliance according to claim 3,
wherein the first switching element comprises a first terminal and a second terminal, and is configured such that, when the first switching element is turned on, a current to flow from the power source to the motor flows from the first terminal to the second terminal through the first switching element, and
the motor stop condition comprises a condition that a voltage between the first terminal and the second terminal is equal to or greater than a predetermined voltage threshold that is greater than a voltage at which the first switching element is turned on and the motor is driven.

8. The motor driven appliance according to claim 1, further comprising
a forcing turn-off unit configured to turn off the first switching element irrespective of whether the control signal is being output from the control unit when the OFF signal is being output from the monitoring unit.

9. The motor driven appliance according to claim 1, wherein the monitoring unit is further configured to continue the output of the OFF signal until a specific release condition is satisfied if it outputs the OFF signal.

10. The motor driven appliance according to claim 9, wherein the release condition comprises a condition that the operation unit is operated to a predetermined state for stopping the driving of the motor.

11. A protection method of a motor driven appliance comprising a motor and an operation unit configured to accept an external operation input for driving the motor, the method comprises:
   providing first and second switching elements connected in series to each other on a current path from a power source to the motor;
   activating a protection function to turn off the first switching element thereby to stop the motor irrespective of an operating state of the operation unit when a predetermined protection condition is satisfied; and
   monitoring an operating state of the protection function to turn off the second switching element when the protection function is activated.

12. A protection method of a motor driven appliance comprising a motor and an operation unit configured to accept an external operation input for driving the motor, the method comprises:
   providing first and second switching elements connected in series to each other on a current path from a power source to the motor;
   activating a protection function to turn off the first switching element thereby to stop the motor irrespective of an operating state of the operation unit when a predetermined protection condition is satisfied; and
   monitoring an operating state of the protection function to output an OFF signal for turning off the second switching element when the protection function is activated.

* * * * *